P. E. HOLT.
FLUID TRANSMISSION CONTROL.
APPLICATION FILED AUG. 17, 1918.

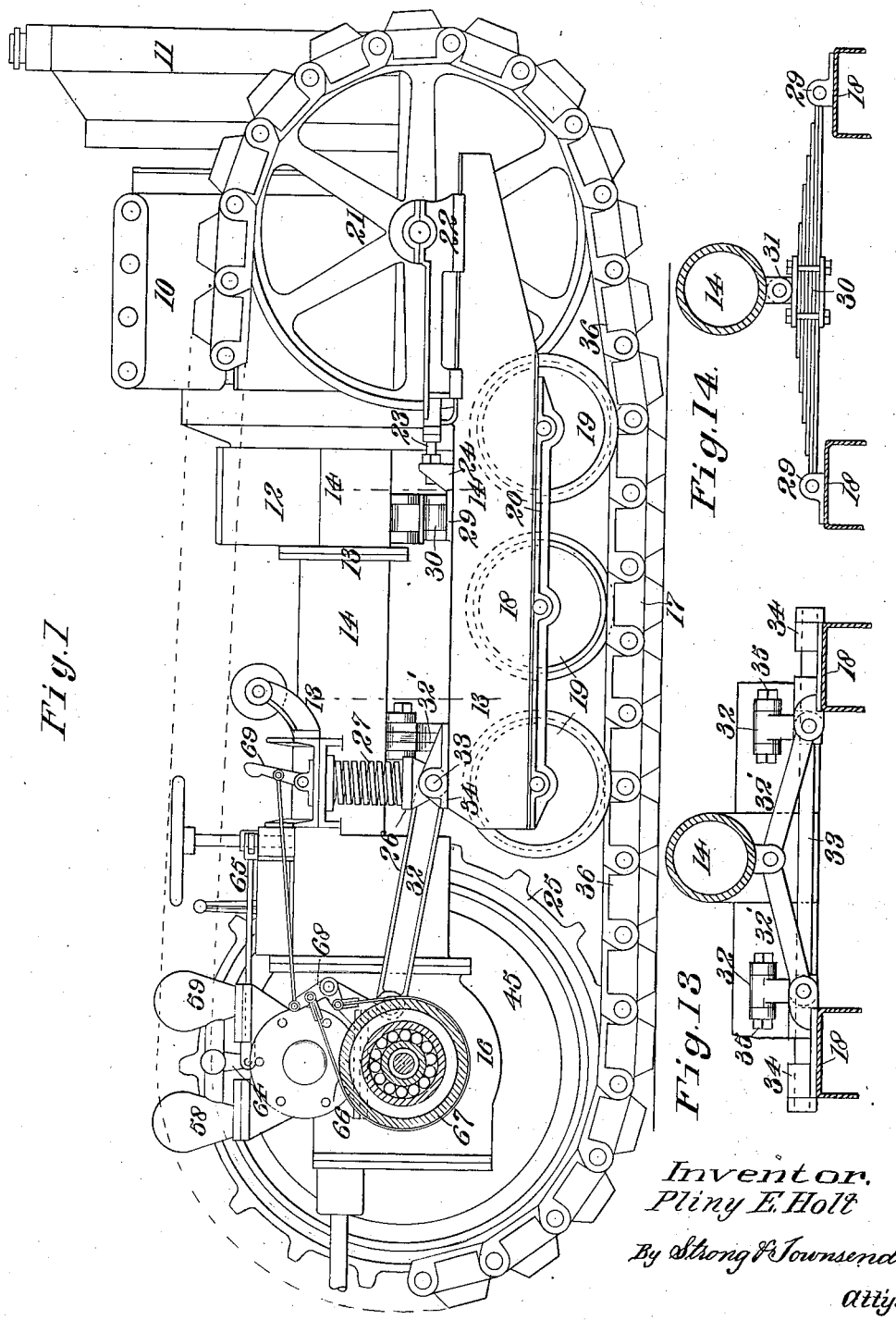

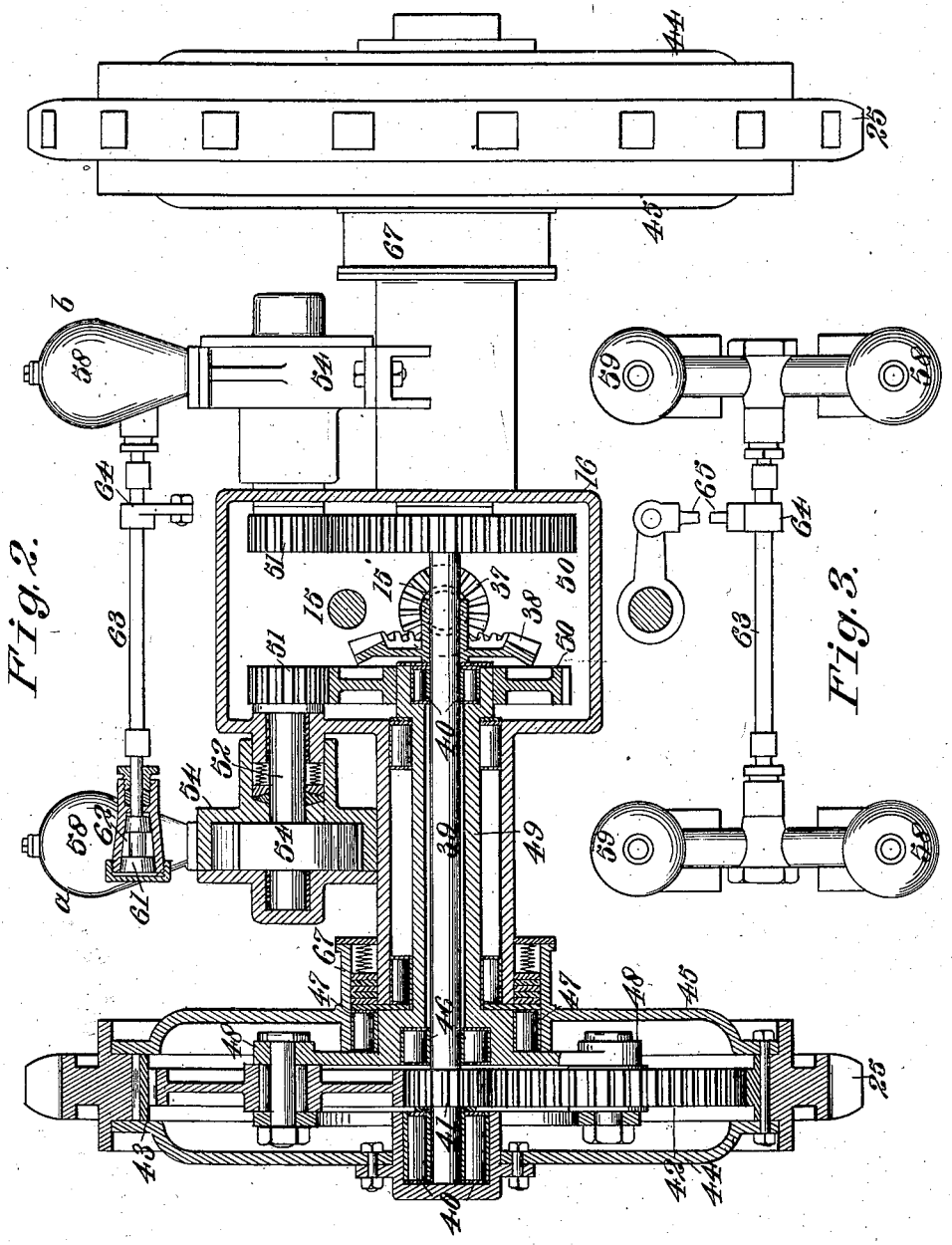

1,356,718.

Patented Oct. 26, 1920.
4 SHEETS—SHEET 3.

Inventor
Pliny E. Holt.
By Strong & Townsend
attys

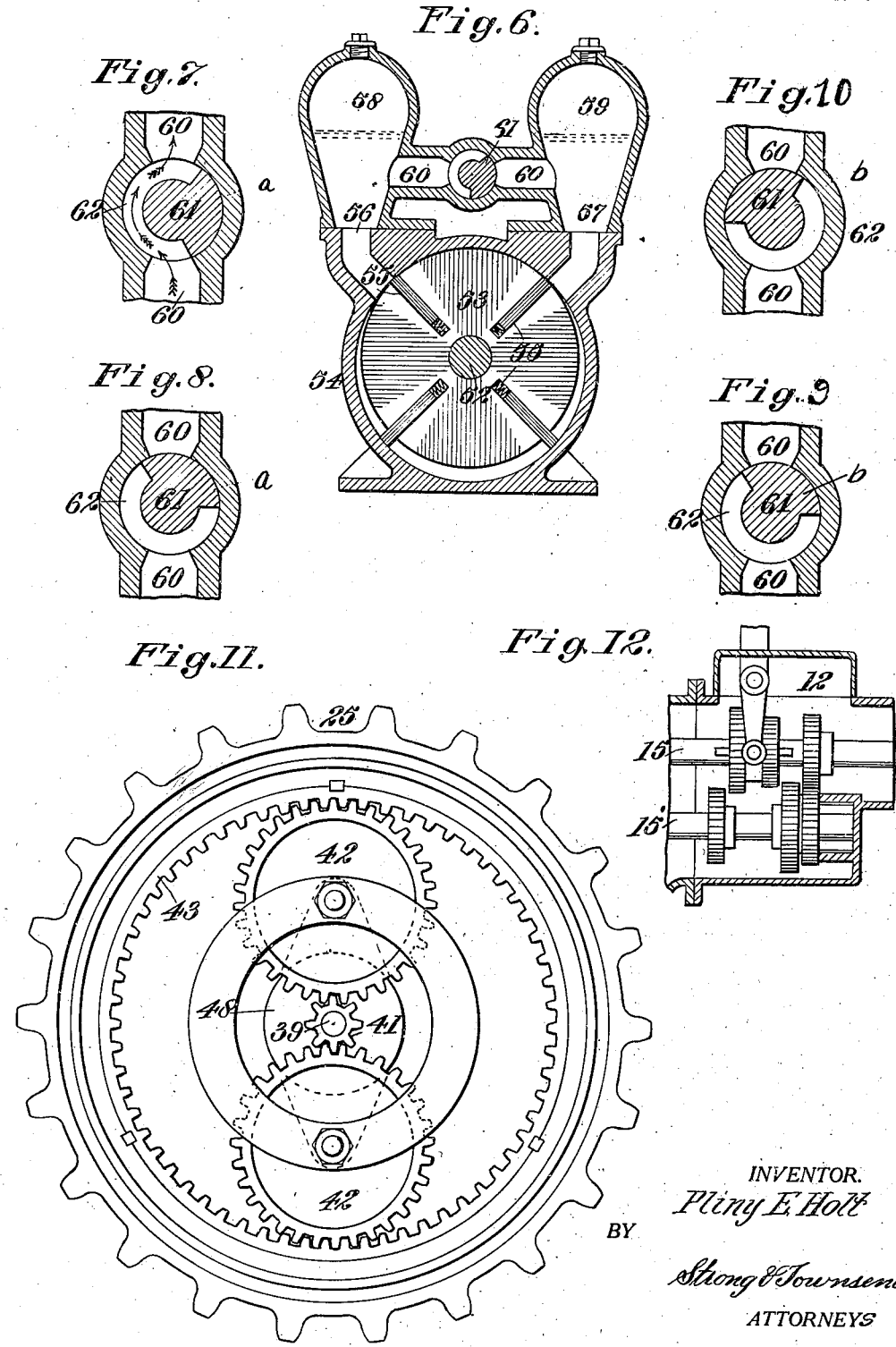

UNITED STATES PATENT OFFICE.

PLINY E. HOLT, OF STOCKTON, CALIFORNIA, ASSIGNOR TO THE HOLT MANUFACTURING COMPANY, OF STOCKTON, CALIFORNIA, A CORPORATION OF CALIFORNIA.

FLUID TRANSMISSION CONTROL.

1,356,718.     Specification of Letters Patent.     Patented Oct. 26, 1920.

Application filed August 17, 1918. Serial No. 250,342.

*To all whom it may concern:*

Be it known that I, PLINY E. HOLT, a citizen of the United States, residing at Stockton, in the county of San Joaquin and State of California, have invented a new and useful Improvement in Fluid Transmission Controls, of which the following is a specification.

This invention relates to power transmission for motor vehicles, and particularly pertains to a fluid control therefor.

In motor vehicle practice, and especially in connection with tractors of the chain tread track type, it is desirable to provide means for separately controlling the operation of the tracks and thereby to retard the movement of the vehicle or to vary the relative lineal speeds of the tracks so that the vehicle may be easily guided.

It is the principal object of the present invention, therefore, to provide means for controlling the speed of movement of the tracks without interrupting the delivery of power thereto and in a manner to allow the vehicle to be turned on any radius desired by the driver without disengaging gears or clutches or requiring that additional gears be placed in mesh.

Having reference to the accompanying drawings:

Figure 1 is a view in side elevation, illustrating a tractor of common construction fitted with the transmission with which the present invention is involved.

Fig. 2 is an enlarged view in section and elevation, illustrating details of the vehicle transmission, the final drive for the vehicle tracks, and the fluid control means therefor.

Fig. 3 is a diagrammatic view disclosing the manner in which the complementary fluid control members are simultaneously actuated.

Fig. 6 is a view in vertical section, illustrating one of the fluid control units and the pressure producing means therefor.

Figs. 7, 8, 9 and 10 illustrate one of the fluid-control, by-pass valves and its different essential positions in its rotation.

Fig. 11 illustrates a driving sprocket and the planetary driving gears provided therefor.

Fig. 12 is a view in section, drawn on a reduced scale, illustrating the speed-changing means of the transmission.

Fig. 13 is a vertical transverse section taken on the line 13—13 of Fig. 1.

Fig. 14 is a view in transverse section, illustrating the manner in which the body of the tractor is suspended from the trucks at its forward end.

Figure 4:
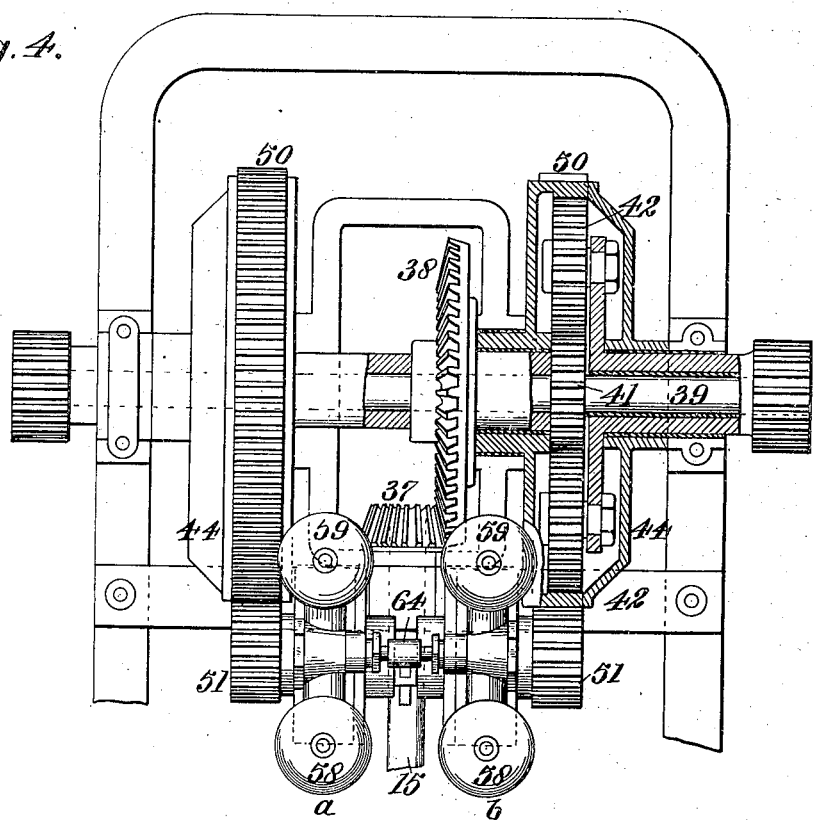
Fig. 4 is an enlarged view in plan of a modified form, illustrating the transmission and its relation to the fluid control mechanism.
Figure 5:
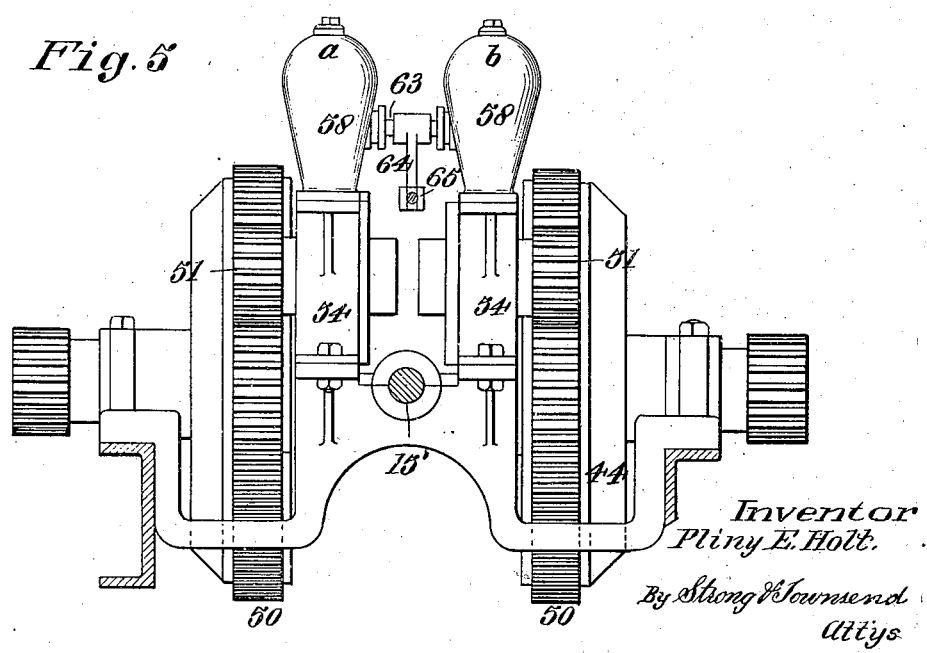
Fig. 5 is a view in elevation of the device shown in Fig. 4.

10 indicates the power unit of a tractor. In the present instance this is constituted by an internal combustion engine placed at the forward end of the structure and directly in the rear of a water radiator 11. Bolted directly to the rear of the engine case is a speed-changing transmission 12 having a gear set as conventionally indicated in Fig. 12. The case of this transmission is formed with a circular plate 13, which is adapted to receive the forward end of a cylindrical torsion tube 14. This tube is of proper diameter to accommodate a propeller shaft 15 leading directly from the engine to a transmission case 16. The transmission case is securely bolted to the opposite end of the tube 14.

An analysis of this construction will show that the engine housing, the speed-changing transmission case, the torsion tube and the rear transmission mechanism case are all bolted together to form an integral structure which extends the length of the vehicle. Due to this arrangement a frame is not required and the opposite self-laying track units 17 are suspended from the opposite sides of the unitary power developing and transmitting structure.

The truck units constitute roller truck frames 18, similar to those disclosed in a copending application entitled "Roller truck frame," Ser. No. 213,469, filed January 24th, 1918. These frames are formed of pressed metal and are U-shaped in transverse section to encompass the upper portions of track rollers 19 and to form a bearing support for the spindles thereof. The lower flanged edges of these frames are provided with continuous bearing boxes 20 adapted to simultaneously inclose all of the roller spindles. The forward end of the frame is fork-shaped and thus extends upon the opposite sides of a track idler wheel 21. Suitable bearings 22 are provided for this idler wheel which are carried by the bifurcated members of the frame.

In the present instance these bearings are provided with longitudinal sliding movement along the frame and are adjustably held by bolts 23 mounted at their rear ends within brackets 24. The frame members terminate at points substantially in front of the rear chain sprockets 25 and here they are provided with spring seats 26, upon which helical springs 27 are seated. These springs stand vertically and support the rear portion of the transmission structure by means of outstanding brackets formed on the sides of the torsion tube 14. This provides the frame with a resilient connection in relation to the main body of the tractor at its rear end. The forward end of the frame is yieldably connected to the tractor body, as shown in Fig. 14. Here it will be seen that the opposite truck frames 18 are fitted with blocks 29 pivotally engaging the outer ends of a leaf spring 30. This spring extends transversely beneath the transmission case 12 and is secured to this case upon a spring seat 31. In this manner it will be seen that the front and rear of the vehicle body are yieldably supported upon the opposite frames and that these two frames may have a limited movement in relation to each other and the body as produced by inequalities in the ground surface.

In order that the trucks may be properly tied to the tractor body and pivotally connected therewith a pair of radius rods 32 are provided, as shown in Figs. 1 and 13. The radius rods have bearings at their forward ends adapted to receive a transversely extending shaft 33. The shaft 33 is journaled in bearing members 34 bolted upon the top of each truck frame and near the rear end thereof. The arms of the members 32 extend rearwardly along the opposite sides of the transmission case 16 and pass between lugs cast upon this case. Pivot bolts 35 are secured to the ends of the arms in pivotal relation to the lugs and thus provide simultaneous vertical swinging movement of the trucks in relation to the transmission case and also in relation to the final drive mechanism of the vehicle. Bridle rods 32' are provided, the outer ends of which are connected to the block 34 and the inner ends pivotally connected to the torsion tube 14.

In this connection it is to be noted that the axis of the shaft 33 is disposed below the plane of the axis of the bolts 35 and that as the rear portions of the trucks are allowed to swing upwardly they will shorten the distance between the axes of the front and rear wheels 21 and 25 and thus produce a desirable slack in the chain track 36.

The transmission case 16 is provided with a bearing to receive the rear end of the propeller shaft 15'. This shaft is here fitted with a bevel pinion 37 in constant mesh with a bevel gear 38. The gear 38 is fixed upon a transversely extending final drive shaft 39. This shaft extends outwardly through antifriction bearings 40 and at its opposite ends carries driving pinions 41. The pinions 41 are in constant mesh with diametrically opposite intermediate gears 42 which are in mesh with an internal spur gear 43. One of the ring gears 43 is keyed within each of the sprockets 25 and provides a drive therefor.

The sprocket construction is clearly shown in Fig. 2, where it will be seen that opposite closure plates 44 and 45 are bolted to the opposite sides of the sprocket and entirely protect the gears 41, 42 and 43. These plates are formed with bearings 46 and 47. The outer of these bearings 46 carries a series of antifriction rollers adapted to support the outer terminating end of the shaft. The inner bearing is provided with a series of anti-friction rollers which rotatably support a planetary gear spider 48.

The planetary gear spider 48 is provided in the present instance to pivotally support the opposite gears 42 and maintain them in mesh with the pinion 41 and gear 43. It will be seen that by rotation of the spider and by allowing the spider to stand at rest different speed ratios may be established between the sprocket wheel and the final drive shaft.

The present invention is to a great extent concerned with means for effecting relative differences in rotation between the final drive shaft and the sprockets and also for selectively determining relative speed ratios between the two drive sprockets, thus readily controlling the course of travel of the tractor.

The above mentioned object is accomplished in the present instance by forming each of the spiders with a tubular sleeve 49, through which the shaft 39 extends. This sleeve projects into the main body of the gear case 16 and is supported therealong by means of suitable roller bearings. The inner end of the sleeve is also rotatably supported upon the shaft 39. This sleeve end is fitted with a spur gear 50 which is in mesh with a spur pinion 51. The pinion 51 is rigidly held upon the end of a stub shaft 52, which shaft is parallel to the main shaft 39 and thereabove.

It will be understood that suitable bearings will be provided for this shaft to eliminate friction; and it will be further apparent that while one of the spider structures is shown with its control the entire mechanism is in duplicate and operated in an identical manner within each wheel. The shafts 52 are each provided with a fluid pump rotor 53. This rotor is incased within an auxiliary pump housing 54 and disposed eccentrically to the inclosing chamber. A series of radially extending vanes 55 is mounted within slots in the rotor and normally bear against the interior wall thereof.

Formed at opposite sides of the pump housing and near the top thereof is a pair of ports 56 and 57. These are disposed at substantially right angles to each other and communicate with compression chambers 58 and 59. This structure is particularly shown in Fig. 6.

Under normal conditions the compression domes are not in communication, although a passageway 60 is formed from one to the other thereof. Interposed within this passageway 60 is a rotary valve 61 formed with a by-pass port 62. Manipulation of this valve will permit a predetermined volume of a fluid or liquid to travel from one of the domes to the other when the rotor is in motion. As it is preferable to use an incompressible fluid within the pump structure, it will be possible to lock the rotor against movement when the passageway 60 is entirely closed, and it will be equally possible to allow a seepage of the fluid from one dome to the other to gradually permit rotation of the rotor at any desired rate of revolution. It will be recognized that any rotation of the rotor will allow a similar rotation of the shaft 52 and the gears 50 and 51, as well as the planetary gear spider 48. This rotation will create a slippage and will change the ratio of speed between the shaft 39 and the sprocket 25 concerned.

It is contemplated to simultaneously control the valve 61 of each compression unit A and B. This is accomplished, as shown in Fig. 3, by disposing the valves in longitudinal alinement with each other and connecting them by a common shaft 63. This shaft is fitted with an operating lever 64 which may be manipulated by a connecting rod 65 and a suitable hand lever.

The valves mounted upon the opposite ends of the shaft are placed with their ports at variance with each other so that when one valve is completely open, as shown in Fig. 7, the opposite valve will be completely closed, as shown in Fig. 9, and so that both valves may be closed simultaneously, as shown in Figs. 8 and 10, thus providing means for simultaneously locking both of the shafts 52 against rotation or alternately releasing these shafts to permit them to rotate at a desired controllable rate of speed.

When the two valves 61 are disposed with their ports closed, the two wheels of the tractor may rotate uniformly and simultaneously. In case it is desired that the wheels shall be retarded in their rotation brake bands 66 are contracted around drums 67 formed as continuations of the plates 45. These bands are actuated by a bell-crank 68 adapted to be moved by a pedal 69.

In driving the tractor here disclosed, the engine is started and power is transmitted to the propeller shaft as controlled by the transmission gears inclosed within the case 12, as indicated in Fig. 12. This set of speed-changing gears also includes gears for reversing the rotation of the propeller shaft in a manner which will be understood. Assuming that the propeller shaft 15 is rotating at a desired rate of speed, power will be transmitted through the gears 37 and 38 to the final drive shaft 39. This shaft will thereafter impart rotation to the ring gears 43 through the pinions 41 which it carries and the intermediate planetary gears 42 carried by the spiders 48. When the tractor is to be driven straight ahead both of the fluid-controlled valves are rotated to assume the positions shown in Figs. 8 and 10. This will prevent a transfer of the incompressible fluid from one dome to the other. This will lock both of the rotors and hold the sleeves of the spider against rotation. This action will fix the two gears 42 and cause power to be transmitted by the gear 41 through the gears 42 to the ring gear 43. A speed reduction will thus be effected between the gear 41 and the gear 43 in a ratio determined by the relative diameters of the various gears involved.

When it is desired to vary the course of travel of the vehicle and to cause it to turn to the left, for example, the shaft 63 will be rotated to open a passageway 60 and allow the fluid to pass from the dome 59 to the dome 58. This escapement will permit rotation of the rotor 53 in the left-hand pump $a$. The opposite valve will stand as shown in Fig. 9 and will thus hold the gears 42 against movement around the axis of the shaft 39.

Due to the fact that the torque of the final drive shaft constantly tends to rotate the spider and indirectly rotate the two pump rotors, the escapement of fluid from one dome to the other will allow the rotor involved to follow its natural tendency and circulate the fluid through the pump casing and through the two compression domes. The rate of circulation will be controlled by the port opening and will therefore allow the gear spider to move or in fact to slip at a desired speed and to lose some of the rotating effort of the final drive shaft and cause the ring gear 43 to be driven at a slower speed than normal. Due to the fact that the opposite gear is continuing its rotation at the normal speed, the tractor will immediately pursue an arcuate course of travel directly determined by the operator and the manner in which he controls the valves 61. A reverse direction in the travel of the vehicle may be effected by a reverse manipulation of the valves.

In starting the vehicle or in encountering unusual road conditions which would momentarily throw an excessive load upon the driving members, the force of the shock will be absorbed within the compression domes. This is due to the fact that these domes are not entirely filled with an incompressible fluid or liquid but are partially filled with air, so that a slight rotation of both rotors may be effected to compress this air and thereby interpose a pneumatic cushion between the power plant and the traction elements. This will relieve the final drive mechanism from excessive strains and also protect the engine from shock and overload.

It will thus be seen that the tractor here disclosed is provided with a simple, unitary power plant, including power generating means and transmission means, that said plant is yieldably mounted upon individual truck frames adapted to be carried by rollers upon separate chain tracks, and that a fluid transmission is provided whereby the relative speeds of travel of these tracks may be controlled to facilitate in guiding the tractor along any desired course of travel either straight ahead, rearwardly or to describe arcs in either direction from a normally straight course.

Having thus described my invention, what I claim and desire to secure by Letters Patent is—

1. In a self-propelled vehicle, a pair of traction devices by which the vehicle is supported and steered, transmission means therefor, including means effective to drive either traction device at variable speeds without varying the speed of the other, and fluid pressure means to control said transmission means.

2. In a self-propelled vehicle, a pair of traction devices by which the vehicle is steered and supported, a driving element therefor, a change speed device between the driving element and each traction device, and fluid pressure means effective normally to maintain said change speed device at constant driving speed, and means to control the fluid pressure means whereby the speed of the traction devices may be altered.

3. In a self-propelled vehicle, a pair of traction devices by which the vehicle is supported and steered, transmission means therefor, including a pair of planetary gear sets, fluid pressure means effective normally to maintain said planetary gear sets at constant speed, and means for controlling the fluid pressure means whereby to vary the effective speed of said planetary gear sets.

4. In a self-propelled vehicle, a pair of traction devices, by which the tractor is supported and steered, transmission means therefor, including a planetary gear set for each traction device, and controllable fluid-pressure operated means to resist the movement of one part of each planetary gear set whereby to vary the speed of either or both traction devices.

5. A power transmission mechanism comprising a driving axle, gears secured upon the opposite ends thereof, planetary gears in mesh with said axle gears, internal gears surrounding said planetary gears and in mesh therewith, means for permitting the planetary gears to move bodily in relation to the inner and outer gears with which they mesh, and a fluid control means for varying the speed of movement of the planetary gear mechanism in relation to the gears meshing therewith.

6. In a power transmission mechanism, a single drive shaft, gear pinions fixed to the opposite ends thereof, internal gears surrounding said pinions, interposed planetary gears meshing with the sprocket gears and the pinions, rotatable spiders carrying the planetary gears, and fluid control means adapted to be effected by a single control lever to alternately permit the spiders to rotate at predetermined speeds and thereby vary the relative speeds of rotation of the two internal gears.

In testimony whereof I have hereunto set my hand in the presence of two subscribing witnesses.

PLINY E. HOLT.

Witnesses:
ALEXANDER S. STEWART,
MARGUERITE G. CRANDALL.